J. C. WEAVER.
DETACHABLE SHOE FOR THE WHEELS OF SELF PROPELLED VEHICLES.
APPLICATION FILED NOV. 11, 1915.
1,213,044.
Patented Jan. 16, 1917.
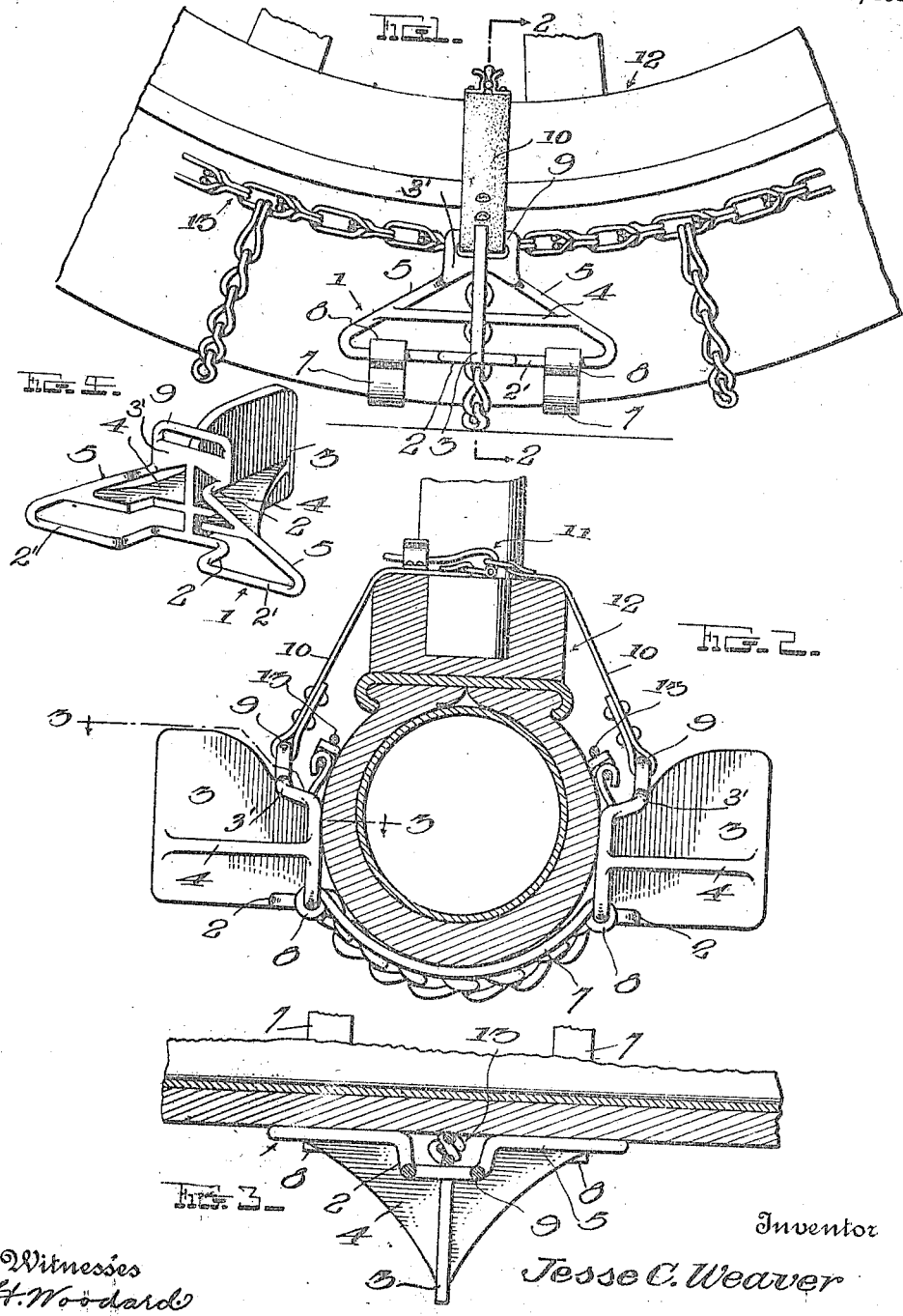
Inventor
Jesse C. Weaver

UNITED STATES PATENT OFFICE.

JESSE C. WEAVER, OF OAKLAND, NEBRASKA.

DETACHABLE SHOE FOR THE WHEELS OF SELF-PROPELLED VEHICLES.

1,213,044.

Specification of Letters Patent.  Patented Jan. 16, 1917.

Application filed November 11, 1915. Serial No. 60,879.

*To all whom it may concern:*

Be it known that I, JESSE C. WEAVER, a citizen of the United States, residing at Oakland, in the county of Burt and State of Nebraska, have invented certain new and useful Improvements in Detachable Shoes for the Wheels of Self-Propelled Vehicles; and I do declare the following to be a full, clear, and exact description of the invention, such as will enable others skilled in the art to which it appertains to make and use the same.

This invention relates to improvements in tire shoes for the wheels of self-propelled vehicles, particularly of the automobile type.

In the operation of an automobile or other motor driven vehicle, great difficulty is experienced in driving the machine over muddy roads, owing to the fact that the wheels will cut deep into the mud under the weight of the car and the engine, and when thus buried, will slip and revolve when the power is applied without moving the car. Various means have been used to overcome this difficulty. Some drivers have wrapped the wheel with some material for the purpose of increasing the friction or traction to such an extent that the wheel will grip the soil and push the car forward. This, however, is a very troublesome and inefficient manner for effecting this result.

The main object of this invention therefore, is to overcome this difficulty by the provision of a mud shoe which can be attached or detached to the wheel of the vehicle even when the wheel is stuck in mud.

Another object of the invention is to provide a mud lug which will not come into engagement with the hard roadbed or surface over which the vehicle is passing.

A still further object is to provide a device of this character which will be simple, strong, durable and inexpensive to manufacture, reliable in operation, and one which will be well adapted to the purpose for which it is designed.

With these and other objects in view, the invention consists of certain novel features of construction, and the combination and arrangement of parts which will be hereinafter fully described and claimed.

In the accompanying drawings in which similar reference characters designate like parts throughout the several views: Figure 1 is a side elevation of a portion of an automobile wheel equipped with a mud lug construction in accordance with this invention; Fig. 2 is a cross sectional view taken on the line 2—2 of Fig. 1; Fig. 3 is a horizontal sectional view taken on the line 3—3 of Fig. 2; and Fig. 4 is a perspective view of one of the frames.

The preferred embodiment of the present invention comprises a pair of open triangular frames 1, the outer ends of which at their central portions are offset laterally outwardly as at 2 to form a pair of spaced strap receiving portions 2' on the opposite sides of the offset portion 2. The portions of the sides 5 of the frames 1 forming the angles at the other ends of the latter are also offset laterally as at 3' for a purpose to be hereinafter described. Extending longitudinally from these laterally offset portions 3' are strap receiving loops 9. It will thus be seen that these strap receiving loops 9 are offset outwardly with respect to the frames 1. The purpose of this will hereinafter appear.

Projecting laterally outwardly and extending longitudinally of the frames 1 are mud lugs 3. These lugs 3 are preferably cast integral with the offset portions 2 and 3' of the frames, and are braced by pairs of integrally connected ribs 4, the latter being also cast integral with the intermediate portions of the sides 5 of the frames. As shown, the ribs 4 extend transversely of the frames.

Connecting the outer ends of the frames is a pair of connecting members in the form of spaced straps 7, which are preferably composed of metal, and are curved longitudinally and provided at their ends with eyes 8, the latter being adapted to fit around the strap receiving portions 2'. The reference numeral 10 designates a leather or other flexible strap or member, the ends of which are attached in any suitable manner to the loops 9 at the inner ends of the frames, it being obvious that the points of connection of the straps 10 are offset outwardly from the frames 1. Arranged within the length of the strap 10 is a buckle or other suitable means for tightening the same, here shown in the form of ordinary hame fasteners 11.

In the drawing the device is shown applied to an automobile wheel 12, the frames 1 being disposed on opposite sides of the tire, the straps 7 passing around the tread of the latter and the strap 10 around the felly. This wheel 12 may be equipped with an ordinary anti-slipping chain 13, the transverse portions of which being disposed beneath the offset portions 2 and 3' of the frames, as clearly shown in Figs. 1 and 3 of the drawings, while the circumferentially extending portions of the chain 13 are received under the loops 9, the latter being offset laterally from said frames for this purpose, as most clearly shown in Fig. 2. When the device is thus applied, the lugs 3 are spaced inwardly from the tread of the tire so as not to come into engagement with the hard roadbed or surface over which the vehicle is passing. If, owing to the weight of the car and engine, the wheels should become partially buried or stuck in mud, the lugs 3 will grip the same and prevent the wheels from slipping, thus pushing the car forward.

It may be seen that this device can be quickly and easily attached and detached from the wheels of an automobile even though they are embedded in the mud.

Various minor changes as to form and proportion may be resorted to without departing from the spirit of this invention and hence I do not wish to be limited to the construction herein shown other than that set forth in the appended claims.

I claim as my invention:

1. A shoe of the class described designed for use in connection with vehicle wheels carrying anti-skid chains having circumferential and transverse portions; comprising a pair of frames adapted to be disposed on the opposite sides of the tire of the wheel and being offset laterally outwardly intermediate their widths to adapt them to receive the transverse portions of said chains, means connecting the inner ends of said frames and having their points of connection with the latter offset laterally from the same to provide for the reception of the circumferential portions of said chains, means connecting the outer ends of said frames, and mud lugs on the outer sides of the latter.

2. An article of manufacture of the class described comprising an open triangular frame, the central portion of one of its ends being offset laterally to form strap receiving portions on the opposite sides of said central portion, the portions of the sides of said frame forming the angle at the other end thereof being also offset laterally and provided with a strap receiving loop, and a lug extending laterally from one side of said frame.

In testimony whereof I have hereunto set my hand in presence of two subscribing witnesses.

JESSE C. WEAVER.

Witnesses:
FRANK E. PEDER,
A. L. CULL.